(12) United States Patent
Donoho et al.

(10) Patent No.: US 8,065,842 B2
(45) Date of Patent: *Nov. 29, 2011

(54) METAL BIRD SPIKE WITH MEMORY SHAPE BASE

(75) Inventors: Bruce Donoho, Mission Viejo, CA (US); Rajen Rathod, Bartlett, IL (US)

(73) Assignee: Bird-B-Gone, Inc., Misson Viejo ( * ) Notice: Subject to any disclaimer, the term of this patent is extended or adjusted under 35 U.S.C. 154(b) by 0 days.

This patent is subject to a terminal disclaimer.

(21) Appl. No.: 12/881,950

(22) Filed: Sep. 14, 2010

(65) Prior Publication Data

US 2011/0041420 A1 Feb. 24, 2011

Related U.S. Application Data

(63) Continuation of application No. 12/830,050, filed on Jul. 2, 2010, now Pat. No. 7,802,405.

(60) Provisional application No. 61/236,011, filed on Aug. 21, 2009.

(51) Int. Cl.
*E04B 1/72* (2006.01)
(52) U.S. Cl. .......................................... 52/101; 52/79.1

(58) Field of Classification Search ................... 52/79.1, 52/101
See application file for complete search history.

(56) References Cited

U.S. PATENT DOCUMENTS

| 6,546,676 | B2 * | 4/2003 | Wiesener et al. | 52/101 |
| 7,243,465 | B2 * | 7/2007 | Donoho | 52/101 |
| 7,802,405 | B1 * | 9/2010 | Donoho et al. | 52/101 |
| 2003/0208967 | A1 * | 11/2003 | Riddell | 52/101 |
| 2004/0216393 | A1 * | 11/2004 | Hall et al. | 52/79.1 |

FOREIGN PATENT DOCUMENTS

| GB | 2432412 B | 10/2009 |
| WO | 2005/029955 | 4/2005 |

* cited by examiner

*Primary Examiner* — Basil Katcheves
(74) *Attorney, Agent, or Firm* — Fish & Associates, PC

(57) ABSTRACT

A bird deterrent device is presented having a base that is at least partially composed of a metal or metal composite. The base can be configured such that the base has sufficient resiliency to revert to an original form after being bent at least 15°. A plurality of spikes can be coupled to the base so that the device is stackable with other such devices while the spikes are oriented at least 5° out of parallel with respect to a plane of the base. It is contemplated that the devices can be stacked such that the base of one device is less than 3 cm from the base of an adjacent device in the stack.

12 Claims, 5 Drawing Sheets

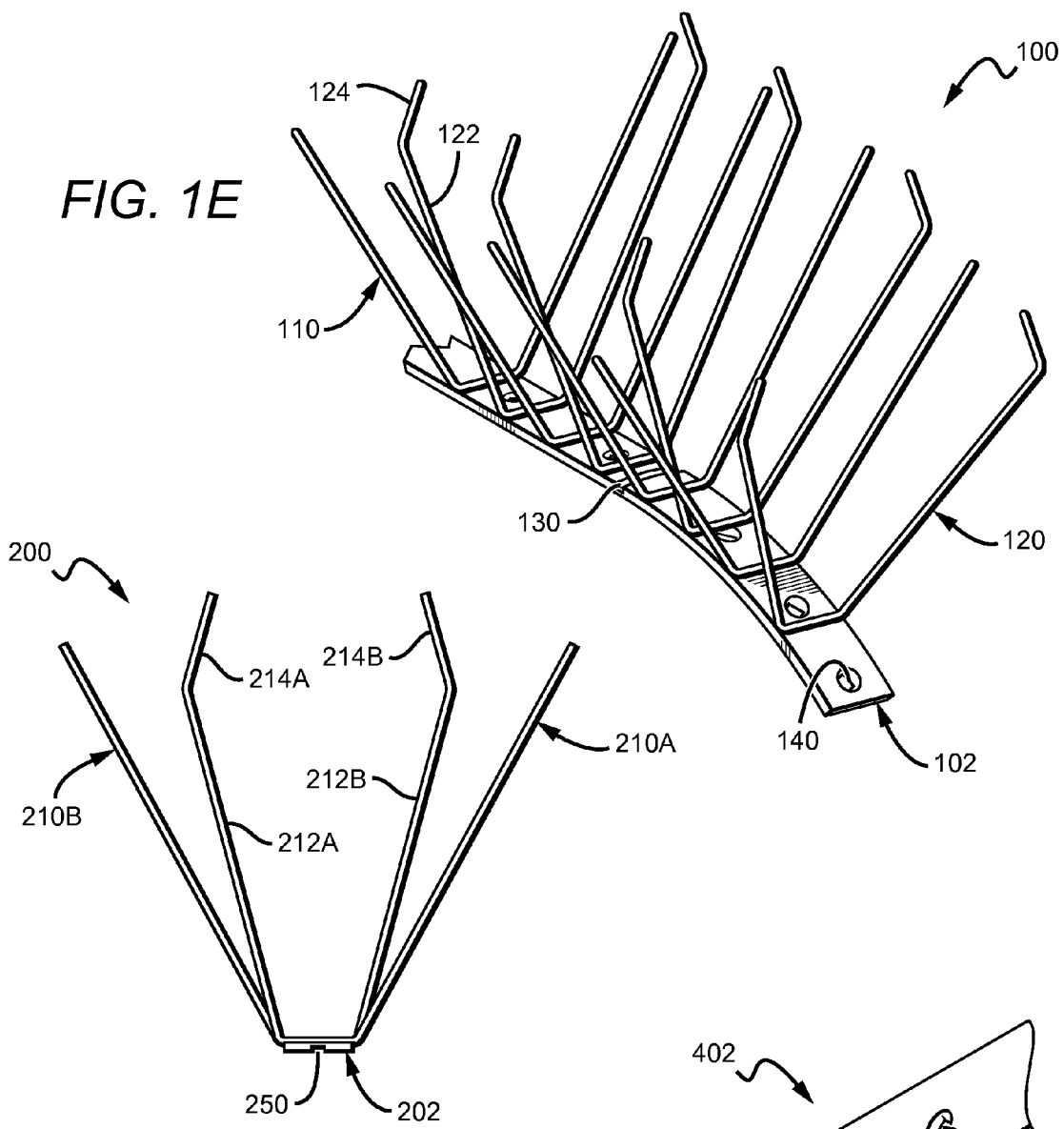
FIG. 1E
FIG. 2A
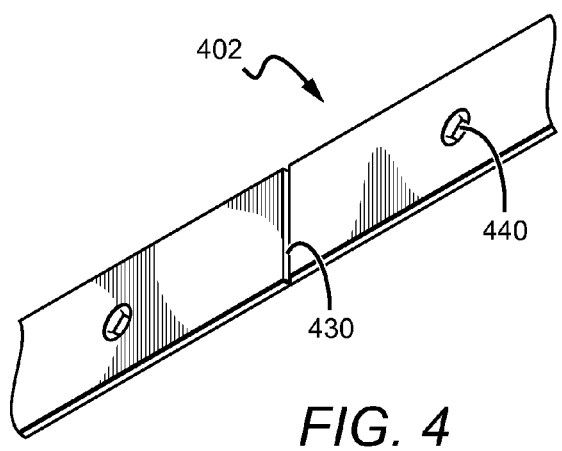
FIG. 4

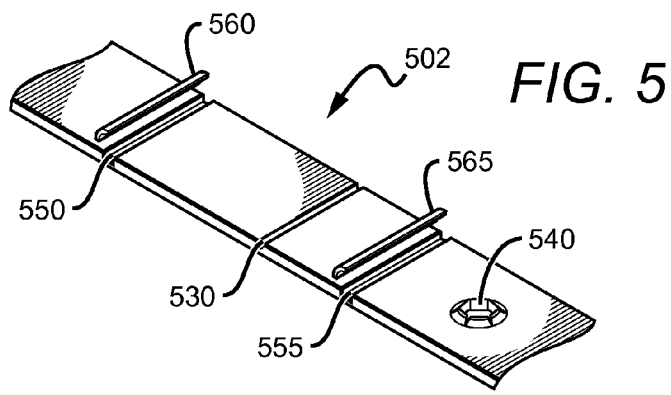
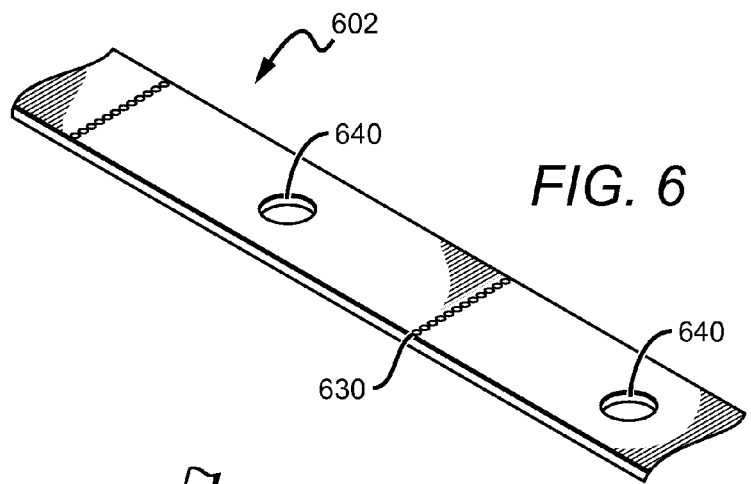
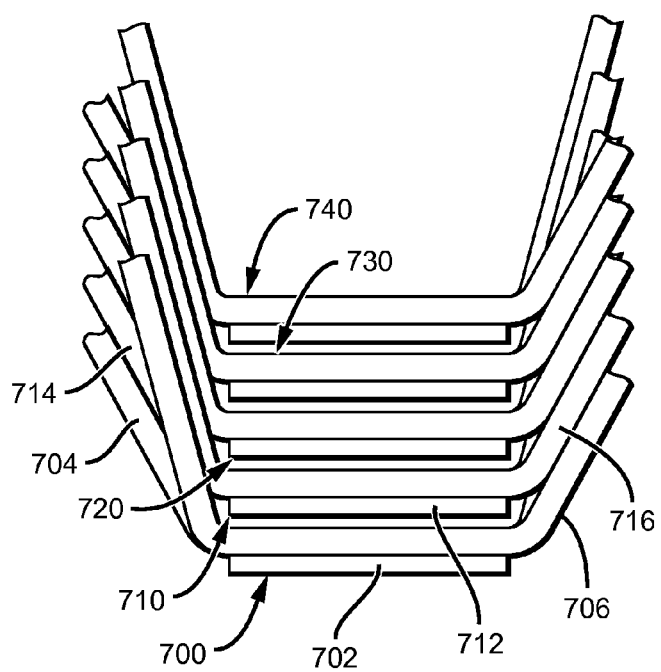

METAL BIRD SPIKE WITH MEMORY SHAPE BASE

This application is a continuation to U.S. utility application having Ser. No. 12/830,050 filed on Jul. 2, 2010 now issued U.S. Pat. No. 7,802,405, which claims priority to U.S. provisional application having Ser. No. 61/236,011 filed on Aug. 21, 2009. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is bird deterrent devices.

BACKGROUND

Birds like to perch in many places that can be problematic for humans, including for example, rooftops, ledges, and other areas on buildings and homes. Among other things, birds tend to be noisy and make an unsightly mess. Devices with projecting spikes are often used to prevent birds from perching, but previously known such devices can be relatively expensive to bring to market, can lack flexibility, and can be dangerous to install.

For example, U.S. Pat. Appl. 2004/0216393 to Hall, et al. (publ. November 2004) describes a bird deterrent device that has a flexible base member with a plurality of prongs. However, the Hall device is not stackable and is therefore expensive to ship (i.e., bring to market). The Hall device can also be expensive to install since it requires a tool to reduce the length of the device.

U.S. Pat. No. 7,243,465 to Donoho describes a bird deterrent having a base with at least one branched spike extending from the base. Like the Hall device, the bird deterrent is also not stackable.

WIPO Publ. No. 2005/029955 to Knight (publ. April 2005) describes a method of manufacturing a bird deterrent device in which the rods are inserted in a direction parallel to the plane of the base. Though stackable, such configuration can be problematic as the rods must be bent during installation. Such bending adds to the time and cost of installation, and increases the chances of injury.

UK Patent No. 2432412B to Jones discusses a bird access prevention device for a chimney pot having a plurality of tines projecting laterally from the band at spaced intervals. While the Jones device is stackable, it is problematic because the band of the device must be mounted off-horizontal, and would require the spikes to be bent to otherwise be effective.

Some bird deterrent devices (e.g., U.S. Pat. Appl. No. 2003/0208967 to Riddell and U.S. Pat. No. 6,546,676 to Wiesener et al.) have a base comprising a series of adjacent segments, which are scored at their junctions to increase the base's flexibility, and facilitates length reduction during installation. However, similar to the above devices, the Riddell device is also not stackable, and therefore has increased shipment costs.

Bird Barrier's™ Dura-Spike device is stackable, but is still problematic to install. Among other things, the base of the device is readily deformed, especially during installation, which can limit the device's contact with the installation surface. In addition, the device can also be expensive to install since it requires a tool to reduce the length of the device.

Thus, there is still a need for a stackable bird deterrent device having a plurality of spikes configured such that the spikes are oriented in a position at least 5° from a position parallel to a plane of the base.

SUMMARY OF THE INVENTION

The inventive subject matter provides apparatus, systems and methods in which a stackable bird deterrent device has a plurality of spikes extending from a metal base, and has at least one of the following additional installation convenience features: (a) a configuration such that the metal base has sufficient resiliency to revert to an original form after being bent at least 15°; and (b) a break point.

As used herein, the term "metal" means at least partially composed of metal or a metal composite. As used herein, the term "stackable" means that a base of a second bird deterrent device of substantially the same configuration as a first bird deterrent device is positioned within 3 cm of a base of the first bird deterrent device when stacked on the first device.

The plurality of spikes are advantageously arranged such that the spikes are at least 5° out of parallel with respect to a plane of the base, such that the orientations of the spikes do not need to be repositioned during installation. However, the specific orientations of the spikes will vary depending on the application.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1E is a perspective view of the bird deterrent device of FIG. 1A being bent.

FIG. 2A is a side view of another embodiment of a bird deterrent device.

FIG. 4 is a close-up view of an alternate embodiment of a base for a bird deterrent device.

FIG. 5 is a close-up view of yet another embodiment of a base for a bird deterrent device.

FIG. 6 is a close-up view of another embodiment of a base for a bird deterrent device.

FIG. 7 is a side view of a stack of bird deterrent devices.

DETAILED DESCRIPTION

In FIGS. 1A-1D, a bird deterrent device 100 is shown having a base 102, and a plurality of alternating spikes 110 and 120 coupled to the base 102. Spikes 110 and 120 can advantageously be oriented with respect to base 102 to (a) effectively deter birds or other pests from perching, and (b) allow multiple bird deterrent devices to be stackable on top of one another, such as to reduce the cost of shipping. Consequently, a plurality of bird deterrent devices can be shipped in a stacked formation with the spikes already coupled to the bases of the devices and prepositioned, thereby reducing the time required for installation, such as that shown in FIG. 7.

Figure 1A:
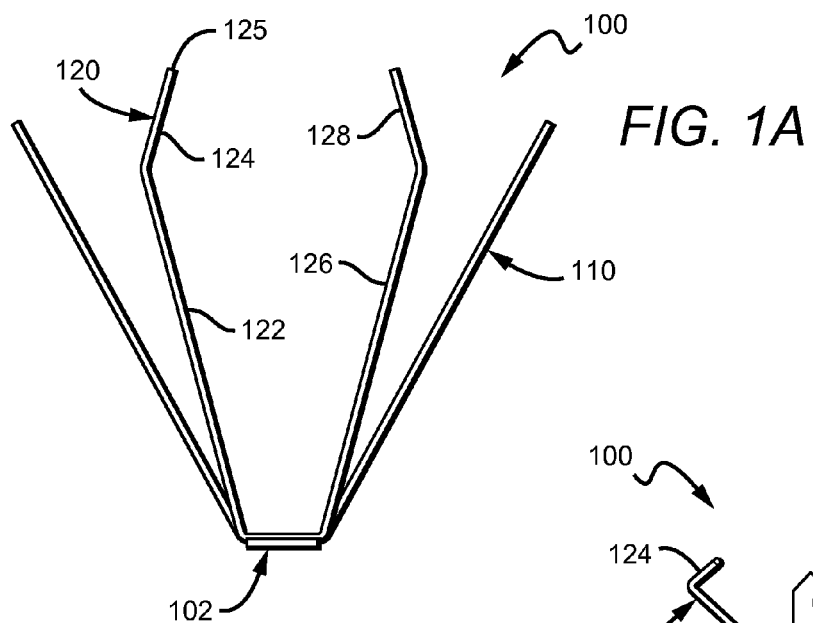
FIG. 1A is a side view of one embodiment of a bird deterrent device.
Figure 1B:
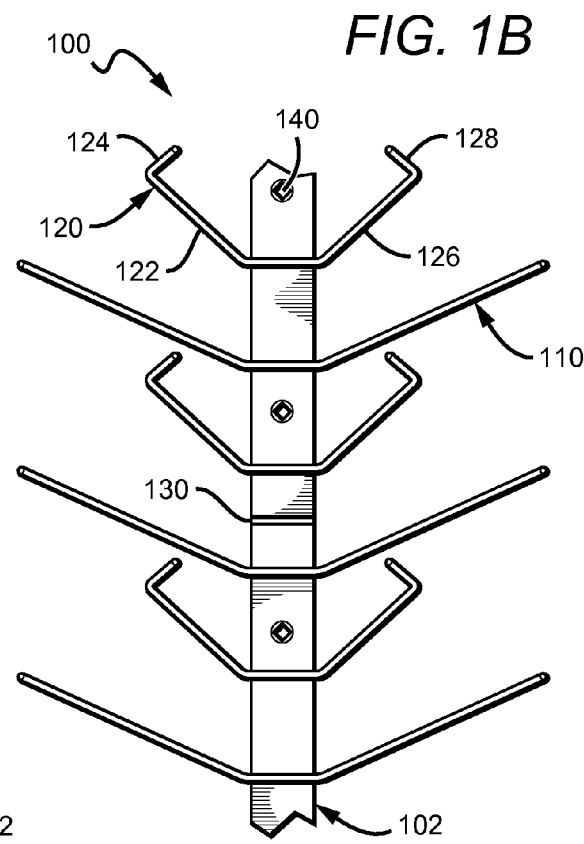
FIGS. 1B and 1C are top and bottom views, respectively, of the bird deterrent device of FIG. 1A.

As shown in FIGS. 1A-1B, at least one of the spikes 120 can have a first portion 122, and a second portion 124 that is disposed at an angle of at least 15° with respect to the first portion 122. In preferred embodiments, the second portion 124 includes a first end 125 of spike 120. Instead of having three or more different configurations of spikes on the base 102, the bird deterrent device 100 disposes the second portion 124 of the spike 120 at an angle to the first portion 122. In this manner, the effective range of the spikes is increased, while reducing the overall number of different configurations of spikes required.

In some contemplated embodiments, spike 120 can also include a third portion 126, and a fourth portion 128 that is disposed at an angle of at least 15° with respect to the third portion 126. Although it is preferred that the angle between the third and fourth portions is equal to the angle between the first and second portions, it is contemplated that the angles could be varied as needed depending on the application. In addition, spike 110 or 120 could include additional angled portions or other commercially suitable configurations.

Typically, spikes 110 and 120 can each have an overall length of between 6 to 15 inches, although specific dimensions will vary depending on the application. The spikes 110 and 120 can be coupled to the base 102 at predetermined intervals, which could, for example, be every one-half inch. However, it is also contemplated that the spikes 110 and 120 could be coupled to the base 102 at lesser or greater intervals, and/or at varying intervals. Each of the spikes 110 and 120 can be coupled to the base 102 by spot-welding, lips (shown in FIG. 5) or mechanical fasteners, glue and other adhesives, or any other commercially suitable fastener(s) or combinations thereof Spikes 110 and 120 can be composed of stainless steel, spring steel, or other metals or metal composites, or any other commercially suitable material(s) or combinations thereof As shown in FIG. 1E, base 102 can be configured such that the base 102 has sufficient resiliency (e.g., high yield strength) to revert to an original form after being bent at least 15°. For example, preferred bases could be bent along an axis that bisects the width of the base 102, and revert back to its original form. This is advantageous because (a) the base 102 can be bent as needed to conform the base 102 to a mounting surface, and (b) minimal bending that can occur during installation, for example, will not permanently deform base 102, which could otherwise prevent the base 102 from being properly attached to a mounting surface. It is especially preferred that the base 102 is configured such that the base 102 can be bent at least 15° at a non-scored portion of the base 102, and then revert to an original form.

As used herein, "mounting surface" means any surface to which the bird deterrent device 100 is desirably mounted, and typically includes rooftops, ledges, windowsills, and rafters.

Base 102 is preferably composed of a metal or metal composite including, for example, stainless steel, spring steel, or any other commercially suitable material(s) or combination(s) thereof Although base 102 preferably has a thickness of between 0.02-0.1 inches, the specific thickness of the base 102 could vary depending on the application. By using a relatively reduced thickness, manufacture of the base 102 thereby uses less material and reduces cost.

In order to reduce the time and tools required to install the bird deterrent device 100 on a mounting surface (not shown), base 102 can include one or more break points 130. The break points 130 advantageously can have (a) a scored portion such as that shown in FIG. 8, (b) a portion otherwise having a reduced thickness from that of the majority of the base 102 such as that shown in FIG. 1B, or (c) other commercially suitable configuration(s) such that the device 100 can be separated into two or more segments without the need for a tool. In this manner, an installer can quickly and easily separate the bird deterrent device 100 at a break point 130 to achieve a desired length of the device 100.

It is contemplated that the base 102 can also include one or more apertures 140 through which nails or other mechanical fasteners can be inserted to secure the base 102 to a mounting surface. Contemplated apertures 140 could be circular, star-shaped, or of any other commercially suitable sizes and dimensions. In some contemplated embodiments, the apertures 140 can be disposed on the base 102 at a set interval of between 1-5 inches or other predetermined intervals. In this instance, and where other upper limits are not expressly stated, the reader should infer a reasonable upper limit. In this instance, for example, a commercially reasonable upper limit is about 30.

Figure 2B:
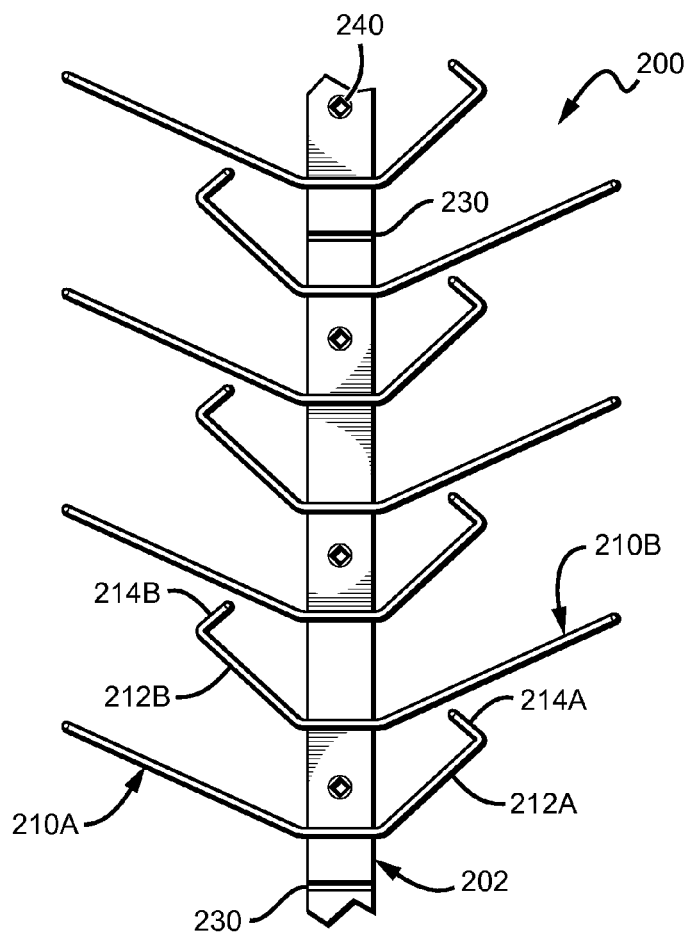
FIGS. 2B and 2C are top and bottom views, respectively, of the bird deterrent device of FIG. 2A.
Figure 2C:
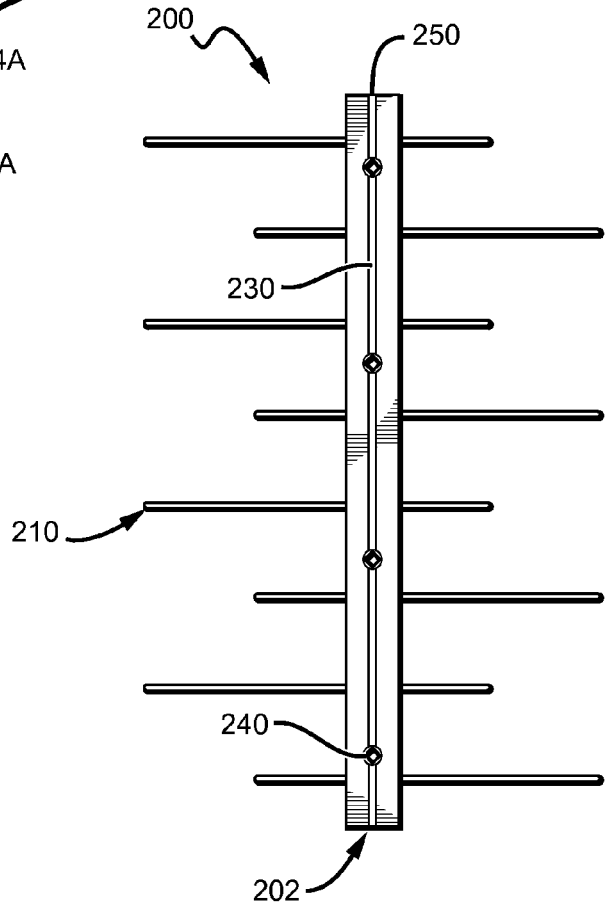

In FIGS. 2A-2C, an alternate embodiment of a bird deterrent device 200 is shown having a base 202, and a plurality of spikes 210A-210B coupled to the base 202. Each of spikes 210A can have a first portion 212A, and a second portion 214A that is disposed at an angle of at least 15° with respect to the first portion 212A. Similarly, each of spikes 210B can have a first portion 212B, and a second portion 214B that is disposed at an angle of at least 15° with respect to the first portion 212B. The spikes 210A-210B are preferably disposed on the base 202, such that each spike is rotated 180° about a vertical axis with respect to an adjacent spike. In this manner, a single spike configuration can form a bird deterrent device 100 having spikes that project in four different directions. The use of a single spike configuration advantageously reduces the manufacturing costs because only one spike configuration must be produced.

Additionally or alternatively, the base 202 can have one or more glue channels 250. Preferably, the glue channels 250 are disposed along a bottom surface of the base 202 of the bird deterrent device 200 such that the device 200 can be quickly and evenly glued to a mounting surface. The glue channels can be disposed parallel to an edge of the device 200, or alternatively, can be disposed at an angle with respect to an edge of device 200.

Figure 3:
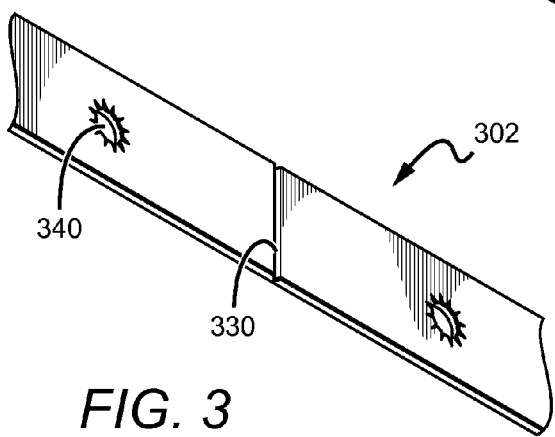
FIG. 3 is a close-up view of one embodiment of a base for a bird deterrent device.
Figure 1C:
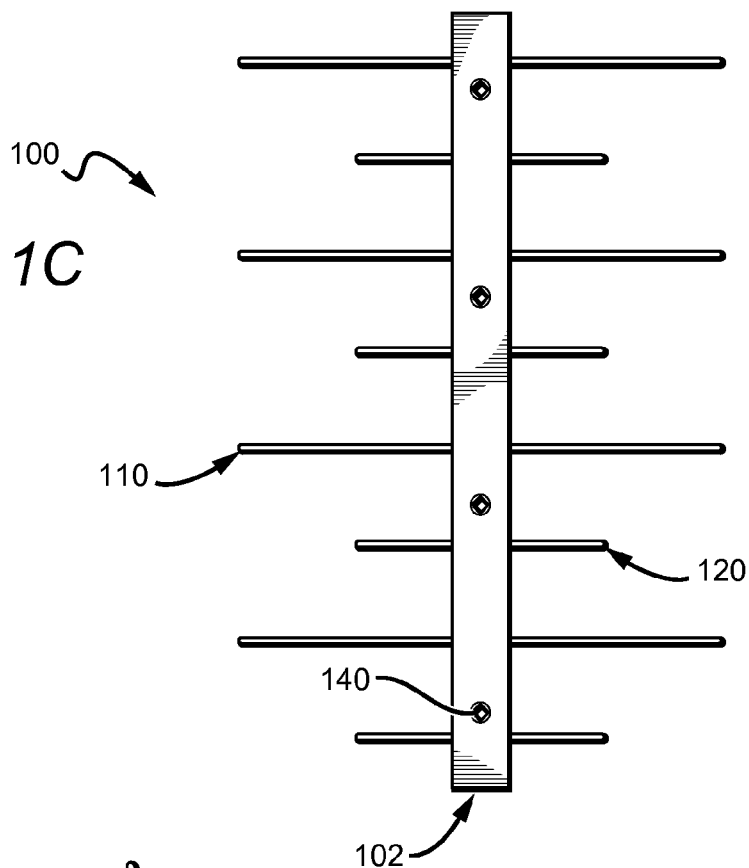
Figure 1D:
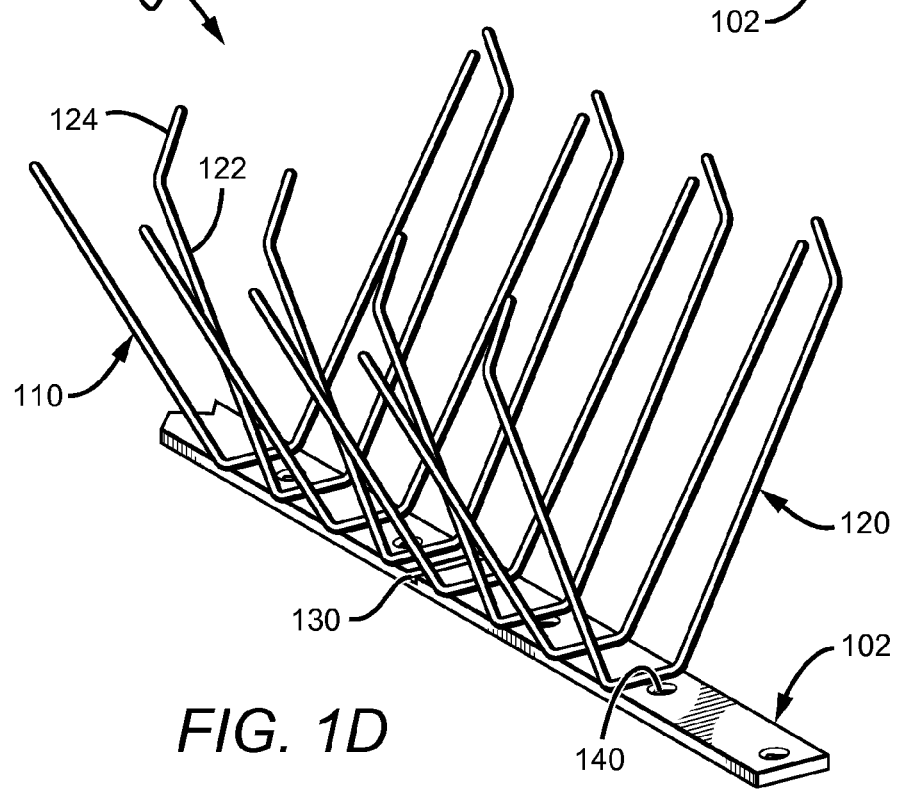
FIG. 1D is a perspective view of the bird deterrent device of FIG. 1A.

FIG. 3 illustrates an alternate embodiment of a base 302 of a bird deterrent device 300 having apertures 340 and a break point 330. FIG. 4 illustrates yet another embodiment of a base 402 of a bird deterrent device 400 having break point 430 and differently shaped apertures 440 from that of the apertures of the device of FIG. 3.

As shown in FIG. 5, the base 502 of a bird deterrent device 500 includes a break point 530, and aperture 540 having a star-shaped configuration. Base 502 can also include first and second lips 560 and 565, respectively, which can each be configured to (a) extend outwardly from the base 502, and (b) bend in one or more directions without rupture. Preferably, the lips 560 and 565 are sized and dimensioned such that the lips 560 and 565 can each be bent to at least partially encompass a spike disposed between each of lips 560 and 565 and the base 502, respectively, and thereby retain the spike between each of lips 560 and 565 and the base 502. This enables spikes to be coupled to the base 502 without the need for welding, glue, or other materials. Optionally, the lips 560 and 565 can be disposed adjacent to a notch 550 or other area of reduced thickness of the base 502, which can be sized and dimensioned to receive at least a portion of a spike. This can act as a guide to facilitate installation of the spikes to the base 502, by holding the spikes in position relative to the base 502 while each lip 560 is being bent. It is contemplated that base 502 could have a plurality of lips such that a plurality of spikes can be coupled to the base 502.

FIG. 6 illustrates yet another embodiment of a base 602 of a bird deterrent device 600 that includes break point 630 having a scored portion. Base 602 can also include apertures 640.

In some contemplated embodiments shown in FIG. 7, bird deterrent devices 700 can be configured such that the device 700 can be stackable, while the spikes 704 and 706 extend outwardly from the base 702 and are oriented at least 5° out of parallel with respect to a plane of the base 702. This is advantageous as it allows multiple bird deterrent devices 700, 710, 720, 730, and 740 to be stacked vertically, and therefore significantly reduces the shipment cost of the devices 700, 710, 720, 730, and 740. In addition, the device 700 can be stacked and shipped with the spikes 704 and 706 pre-oriented, which reduces the time needed for installation and reduces the risk of injury related to bending the spikes during installation. It is contemplated that when the base 702 of a first bird deterrent device 700 and the base 712 of a second device 710 having a plurality of spikes 714 and 716 are in a stacked position, the base 712 of the second device 710 will be less than 3 cm from the base 702 of the first device 700.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring only one element from the group, not A plus N, or B plus N, etc.

What is claimed is:

1. A bird deterrent device, comprising:
    an elongated base at least partially composed of a metal or metal composite, and having at least one of (a) a configuration such that the metal base has sufficient resiliency shape memory to revert to an original form after being bent at a non-break point by at least 15°, and (b) a break point;
    a plurality of spikes coupled to the metal base, each of which is independently oriented at least 5° with respect to a surface normal of the base;
    wherein the bird deterrent device is nestable within a second metal base of a second bird deterrent device and a third metal base of a third bird deterrent device, and wherein the second and third bird deterrent devices have a second and third plurality of spikes, each of which is independently oriented at least 5° with respect to a surface normal of the second and third metal bases, respectively; and
    wherein the metal base is less than 3 cm from the second metal base when the bird deterrent device is nested within the second bird deterrent device, and wherein the second metal base is less than 3 cm from the third metal base when the second bird deterrent device is nested within the third bird deterrent device.

2. The bird deterrent device of claim 1, wherein the metal base has a configuration such that the metal base has sufficient resiliency to revert to an original form after being bent at a non-break point by at least 15°.

3. The bird deterrent device of claim 1, wherein the metal base has a glue channel.

4. The bird deterrent device of claim 1, wherein the metal base has at least one break point.

5. The bird deterrent device of claim 1, wherein the metal base has (a) a configuration such that the metal base has sufficient resiliency to revert to an original form after being bent at a non-break point by at least 15°, and (b) a break point.

6. The bird deterrent device of claim 1, wherein at least some of the plurality of spikes has a first portion extending from the base, and a second portion that is disposed at an angle of at least 15° with respect to the first portion.

7. The bird deterrent device of claim 6, wherein the first portion is disposed between the base and the second portion.

8. The bird deterrent device of claim 1, further comprising at least one aperture that extends through the base.

9. The bird deterrent device of claim 8, wherein the aperture is star-shaped.

10. The bird deterrent device of claim 1, further comprising a first lip coupled to the base and projecting outwardly from the base, and wherein the first lip is configured such that the first lip can be bent to retain at least one of the spikes.

11. The bird deterrent device of claim 10, further comprising a second lip coupled to the base and projecting outwardly from the base, and wherein the second lip is configured such that the second lip can be bent to retain at least one of the spikes.

12. A bird deterrent system, comprising:
    first, second, third, fourth, and fifth bird deterrent devices of claim 1; and
    wherein the first bird deterrent device is nested within the second deterrent device, the second deterrent device is nested within the third deterrent device, the third deterrent device is nested within the fourth deterrent device, and the fourth deterrent device is nested within the fifth deterrent device.

* * * * *